United States Patent
Mair (10) Patent No.: US 9,946,528 B2
(45) Date of Patent: Apr. 17, 2018

(54) SYSTEM AND METHOD FOR AUTOMATED CUSTOMIZATION OF APPLICATIONS

(71) Applicant: BMC SOFTWARE ACQUISITION, L.L.C., Houston, TX (US)

(72) Inventor: Geoff Ross Mair, Vancouver (CA)

(73) Assignee: BMC Software, Inc., Houston, TX (US)

(*) Notice: Subject to any disclaimer, the term of this patent is extended or adjusted under 35 U.S.C. 154(b) by 0 days.

(21) Appl. No.: 14/244,527

(22) Filed: Apr. 3, 2014

(65) Prior Publication Data
US 2014/0366014 A1 Dec. 11, 2014

Related U.S. Application Data

(60) Provisional application No. 61/833,436, filed on Jun. 10, 2013.

(51) Int. Cl.
*G06F 9/445* (2006.01)
*G06F 21/10* (2013.01)

(52) U.S. Cl.
CPC .......... *G06F 8/60* (2013.01); *G06F 21/10* (2013.01)

(58) Field of Classification Search
None
See application file for complete search history.

(56) References Cited

U.S. PATENT DOCUMENTS

| | | | | |
|---|---|---|---|---|
| 5,754,858 A * | 5/1998 | Broman | G06F 8/30 717/111 |
| 8,397,211 B2 * | 3/2013 | Ionfrida | H04L 47/70 717/105 |
| 8,943,124 B2 * | 1/2015 | Massey | G06F 15/16 709/203 |
| 2005/0289154 A1* | 12/2005 | Weiss | G06F 17/30722 |
| 2006/0143135 A1* | 6/2006 | Tucker | G06F 21/121 705/59 |
| 2007/0061486 A1* | 3/2007 | Trinh | G06F 17/30905 709/246 |
| 2008/0066051 A1* | 3/2008 | Stubbs | G06F 8/20 717/107 |
| 2008/0270977 A1* | 10/2008 | Nucci | G06F 8/10 717/105 |
| 2009/0205013 A1* | 8/2009 | Lowes | G06F 21/10 726/1 |

(Continued)

OTHER PUBLICATIONS

Giurgiu et al., "Calling the cloud: Enabling mobile phones as interfaces to cloud applications", Published by Springer-Verlag, 2009.*

*Primary Examiner* — Hossain Morshed
(74) *Attorney, Agent, or Firm* — Brake Hughes Bellermann LLP (57) ABSTRACT

The method includes receiving, at a commercial app store system, an application including embedded customization code, publishing, by the commercial app store system, the application to a commercial app store, associating the application with a license to a private app store, the private app store being associated with the end-user computing device, installing the application on the end-user computing device, receiving an indication from the end-user computing device that the application has launched, and communicating customization data to the end-user computing device.

18 Claims, 5 Drawing Sheets

(56) References Cited

U.S. PATENT DOCUMENTS

| | | | | |
|---|---|---|---|---|
| 2009/0241107 A1* | 9/2009 | Kobayashi | .............. | G06F 21/10 717/178 |
| 2010/0162232 A1* | 6/2010 | Bhatia | ....................... | G06F 8/60 717/178 |
| 2011/0071915 A1* | 3/2011 | Lee | ........................ | G06Q 30/02 705/26.1 |
| 2011/0295986 A1* | 12/2011 | Ferris | .................... | G06F 9/5072 709/222 |
| 2012/0096521 A1* | 4/2012 | Peddada | ............... | G06F 21/629 726/4 |
| 2012/0311659 A1* | 12/2012 | Narain | .................. | G06F 21/629 726/1 |
| 2013/0191823 A1* | 7/2013 | Davidson | ................ | H04L 67/34 717/178 |
| 2013/0239192 A1* | 9/2013 | Linga | ...................... | G06F 21/44 726/7 |
| 2013/0283262 A1* | 10/2013 | Rehtijarvi | ................. | G06F 8/60 717/178 |
| 2014/0074617 A1* | 3/2014 | Mukherji | ........... | G06Q 30/0281 705/14.64 |
| 2014/0108649 A1* | 4/2014 | Barton | ................. | G06F 9/45533 709/224 |
| 2014/0122614 A1* | 5/2014 | Saari | ....................... | H04L 67/10 709/205 |
| 2014/0136712 A1* | 5/2014 | Kim | ........................ | H04L 47/70 709/226 |
| 2014/0366014 A1* | 12/2014 | Mair | ........................ | G06F 8/60 717/177 |

* cited by examiner

SYSTEM AND METHOD FOR AUTOMATED CUSTOMIZATION OF APPLICATIONS

This application claims the benefit of U.S. Provisional Patent Application 61/833,436 filed on Jun. 10, 2013 entitled System and Method for Automated Customization of Applications, the entire contents of which are incorporated herein by reference.

FIELD

This disclosure relates to software and mobile computing devices. More specifically, this disclosure relates to the distribution and control of pre-built or commercially available applications, and the automated run-time customization of those applications for end-users.

BACKGROUND

Application software is computer software designed to operate on a user device and to perform one or more specific related tasks on the user device. Application software is also known as an application or app. An application can be designed to operate on a computing device such as a computer, a tablet computer or a smartphone. An application may be configured to be executed or interpreted by a web browser. Therefore, data and/or code (e.g., script or html) may be communicated to the user device over a network (e.g., the Internet).

A mobile application is application software configured to operate on a mobile device such as a tablet computer or a smartphone. Mobile apps are typically available through an application distribution platform such as an application store. App stores can be commercial or private.

Apps can be created by developers, and then distributed in a package containing the necessary elements to execute the application such as the program code, resources, assets, certificates and manifest. Typically, an application is compiled from the source code and then packaged with the required elements.

Some apps are free. Other apps can be purchased or licensed. Apps are typically downloaded from an app store to an end-user device such as a computer or smartphone. Apps developed for end-user devices (such as mobile devices) can be published in a commercial app store. These apps are not customized for particular end-users. Apps can be developed for specific end-users, and are known as custom apps. These apps can be published in a private app store.

Existing application distribution methods relate to commercial or custom apps only. Therefore, there exists a need for systems and methods for automatically customizing commercial apps at run-time and/or during distribution.

SUMMARY

One embodiment includes a method of delivering a customized application to an end-user computing device. The method includes receiving, at a commercial app store system, an application including embedded customization code, publishing, by the commercial app store system, the application to a commercial app store, associating the application with a license to a private app store, the private app store being associated with the end-user computing device, installing the application on the end-user computing device, receiving an indication from the end-user computing device that the application has launched, and communicating customization data to the end-user computing device.

Another embodiment includes enterprise computing system. The enterprise computing system includes a private app store associated with at least one end-user computing device. The private app store is configured to associate a license with an application published by a commercial app store, receive an indication of a launch of the application installed on the end-user computing device, and communicate customization data to the application based on the license.

Still another embodiment includes a non-transitory computer readable medium storing code segments, that when executed by a processor, cause the processor to perform steps. The steps include receiving, at a commercial app store system, an application including embedded customization code, publishing, by the commercial app store system, the application to a commercial app store, associating the application with a license to a private app store, the private app store being associated with the end-user computing device, installing the application on the end-user computing device, receiving an indication from the end-user computing device that the application has launched, and communicating customization data to the end-user computing device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

Figure 1:
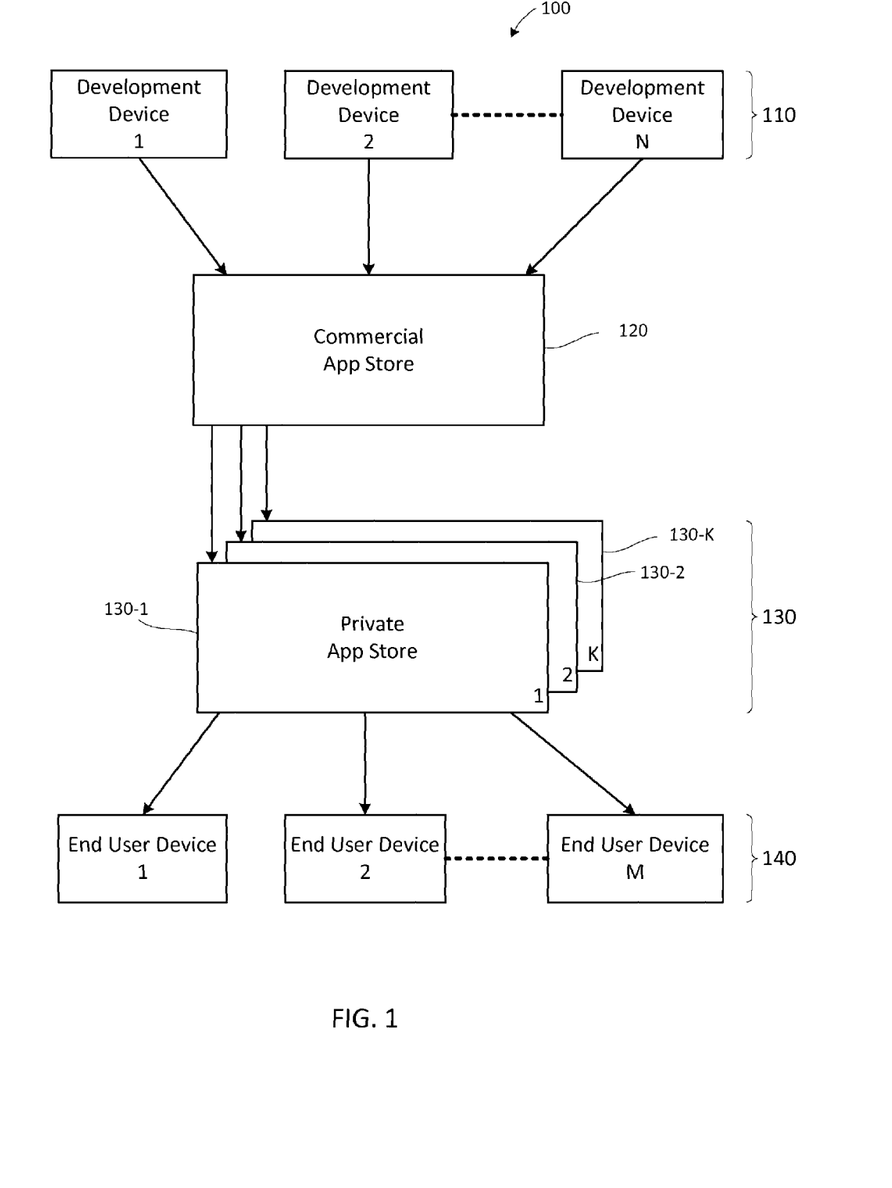
FIG. 1 is a block diagram of a marketplace solution for mobile application distribution, policy and license management, and automated run-time customization.

FIG. 1 is a block diagram of a marketplace system for mobile application distribution, policy and license management, and automated run-time customization. As shown in FIG. 1, marketplace system 100 includes at least one development device 110, a commercial app store 120, at least on private app store 130 and at least one end-user device 140.

A developer may use one of the at least one development device 110 (e.g., Development device 1) to create an application package including application software and the necessary elements to run the application, such as program code, resources, assets, certificates and manifests. The developer using at least one development device 110 can publish application packages (or apps) at commercial app store 120, for example, directly or indirectly. Apps at commercial app store 120 can be accessible to clients or customers of commercial app store 120 who can purchase (for value or free of charge) or license apps. Some clients can be end-users of the software. Other clients can be system administrators of the at least one private app store 130, such as one of private app store 130-1 through 130-K of FIG. 1. A system administrator can purchase licenses from commercial app store 120. The system administrator can publish the licensed application in the private app store 130, and make the commercial app accessible to end-users using at least one end-user device 140.

Private app stores can optionally be elements of a multi-tenanted app store management system. In other words, private app stores may be associated with multi-tenanted application management system(s). Each app store tenancy within the system can be a distinct private app store, such as one of private app stores 130-1 through 130-K.

Figure 2:
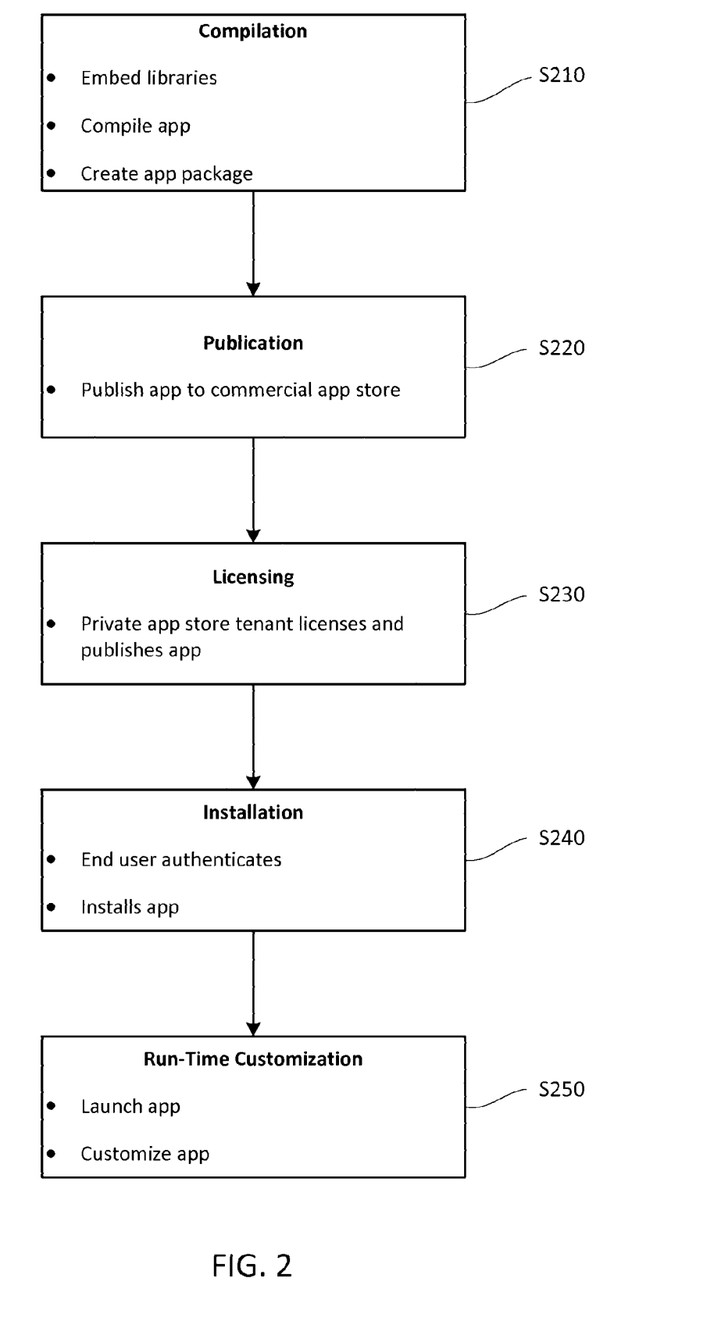
FIG. 2 is a flowchart of a process for distribution and customization of an application.
Figure 3:
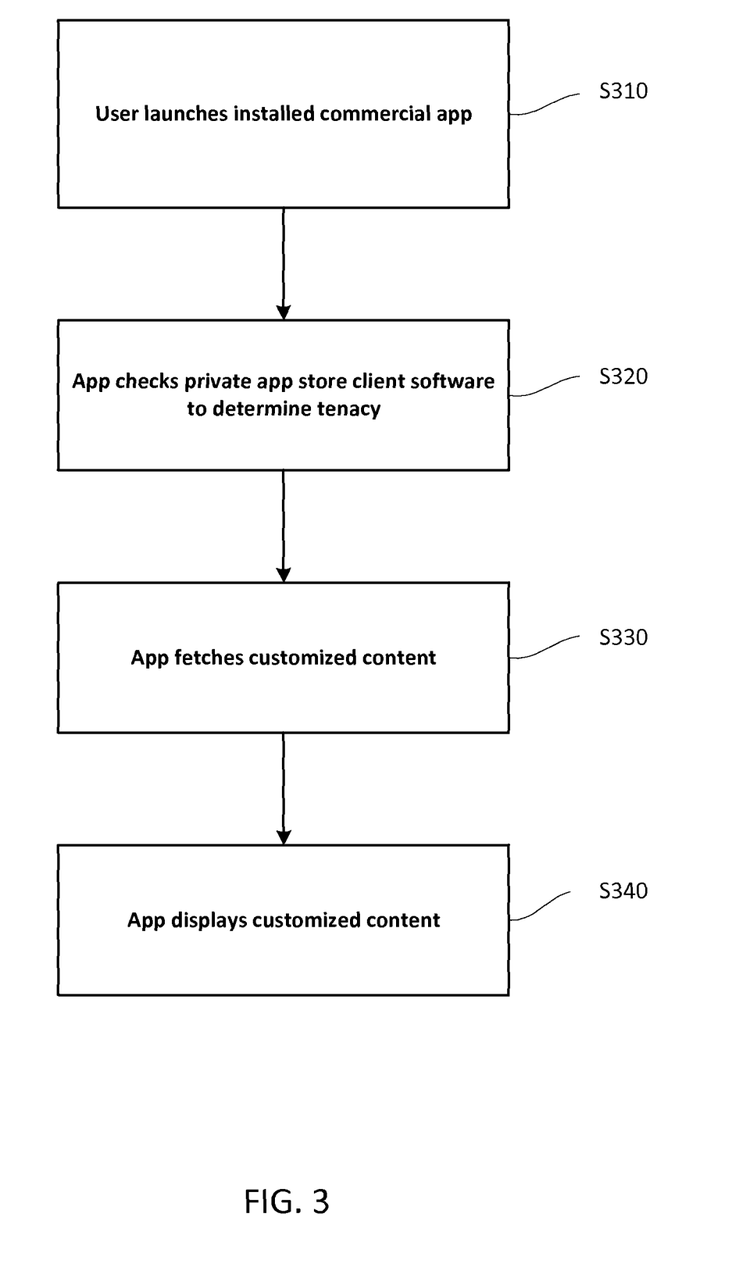
FIG. 3 is a flowchart of a process for automated run-time customization of an application.
Figure 5:
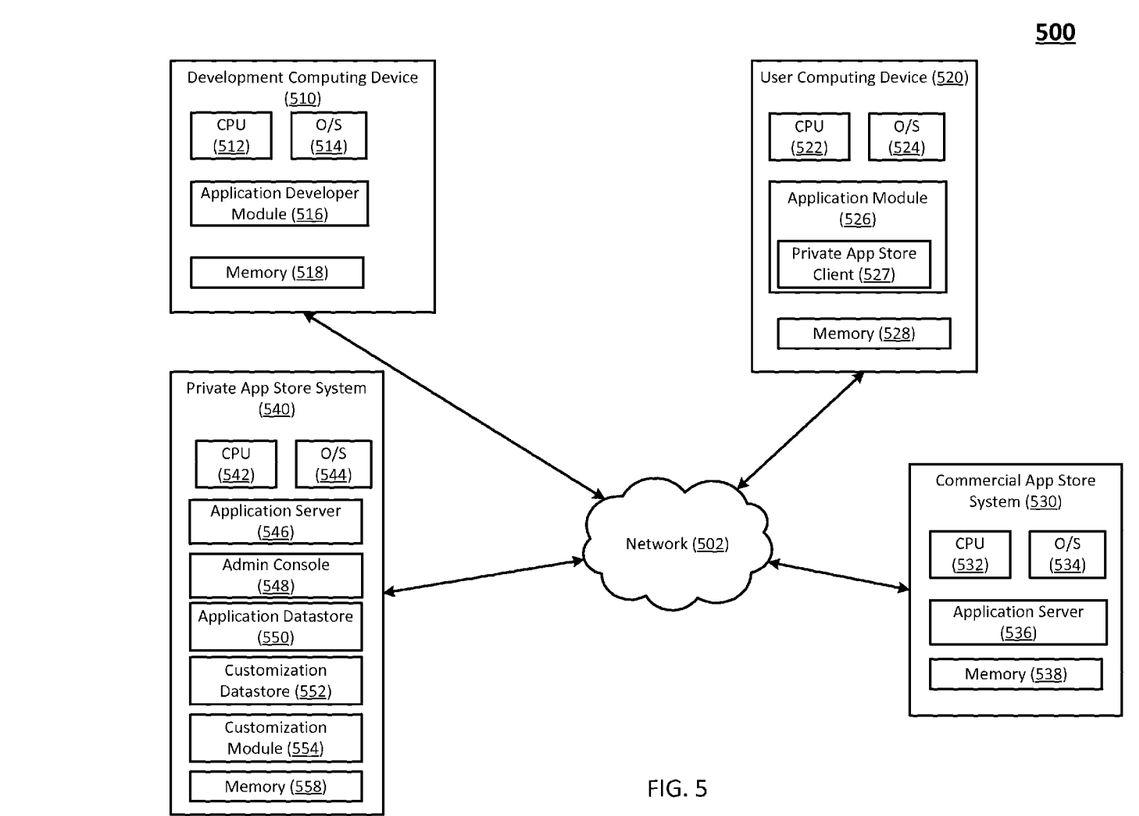
FIG. 5 illustrates a block diagram showing an example system architecture.

FIGS. 2 and 3 are flowcharts of methods according to example embodiments. The steps described with regard to FIGS. 2 and 3 may be performed due to the execution of software code stored in a memory (e.g., at least one memory 518, 528, 538, 558) associated with an apparatus (e.g., as shown in FIG. 5) and executed by at least one processor (e.g., at least one processor 512, 522, 532, 542) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 2 and 3.

FIG. 2 is a flowchart of a process for distribution and customization of an application. As shown in FIG. 2, in step S210 an application is compiled. For example, compilation can include embedding at least one of policy and license management libraries, compiling the application software and creating an application package. The policy and licensing management libraries may include code necessary for run-time customization of the application. Accordingly, the application may include embedded customization code (e.g., libraries included in the application code for customization).

In step S220, the application is published. For example, the developer may publish the application to a commercial app store (such as commercial app store 120 of FIG. 1). Publishing the application makes the app available for purchasing or licensing by a third party. The application may be a commercial application, namely one that is available for purchase by an entity with access to the commercial app store. In order to publish an application, the application may be received at a commercial app store system or communicated by a development system to the commercial app store system. The received or communicated may include compiled code as embedded customization code.

In step S230, the application is licensed by a third party. For example, the application may be associated with a license to a private app store, and, in-turn, the private app store may be associated with an end-user operating an end-user computing device. In some embodiments, the third party can be a system administrator for an organization that is a tenant in a multi-tenanted private app store (such as private app store 130 of FIG. 1). In step S230, the system administrator may purchase a number of licenses for the application and publish the application in the private app store. In other words, one of the application, as a customized application, and a profile for the customized application may be published by the private app store system, in the private app store, once the application has been licensed. Publishing the customized application to the private app store may make the customized application available for downloading to the end-user computing device (e.g., end-user computing device(s) associated with the private app store).

In step S240, the application is installed. For example, an end-user operating a computing device (e.g., end-user device 140) associated with the tenant requests to download and install the application on the end-user's computing device. In some embodiments, the end-user's computing device includes client software that facilitates access to the private app store and provides an association between the end-user's computing device and a computing device (e.g., a server) associated with the tenant. In step S240, the end-user may be authenticated by the computing device associated with the tenant and the application is downloaded and installed on the end-user's computing device.

Once the application is installed on the end-user's computing device, the end-user device may launch the application, and code in the libraries embedded in the application (as executed by a processor of the user's computing device) may customize the application for the particular end-user or for a group of end-users associated with the tenant.

FIG. 3 is a flowchart of a process for automated run-time customization of an application, which are, for example, representative of steps carried out within step 250 in FIG. 2. As shown in FIG. 3, in step S310 an end-user computing device launches an installed commercial application. For example, an end-user, using an interface on the end-user's computing device, launches the commercial application on the end-user's computing device. The application, using a processor associated with the end-user computing device, executes code from the policy and license management libraries.

In step S320 the application checks a private app store client software to determine tenancy. For example, the executing code queries the client software referred to above to determine end-user/tenant information associated with the identity of the end-user (or end-user identity) operating (e.g., logged into) the end-user computing device and the tenant with which the end-user is associated.

In step S330 the application fetches customized content. In other words, the commercial app store system receives an indication from the end-user computing device that the application has launched. The indication (or message) may include the end-user/tenant information so that the commercial app store system can determine what customized content should be fetched. For example, the executing code uses the end-user/tenant information to query the private app store system for custom data related to the tenant and/or end-user. The application, using a processor associated with the end-user computing device, fetches the custom data from the private app store. Custom data can include a logo, a company name or any other suitable data specific to the tenant and/or end-user. Finally, the private app store system communicates (e.g., transmits a message) the customization data to the end-user computing device.

In step S340 the application displays customized content. For example, the application displays some or all (or substantially all) of the custom data to the end-user when the application executes on the end-user computing device. The application now appears as a custom application, namely an application including custom data fetched from a private app store. For example, the application may display a custom logo in, for example, a header of the application.

Figure 4:
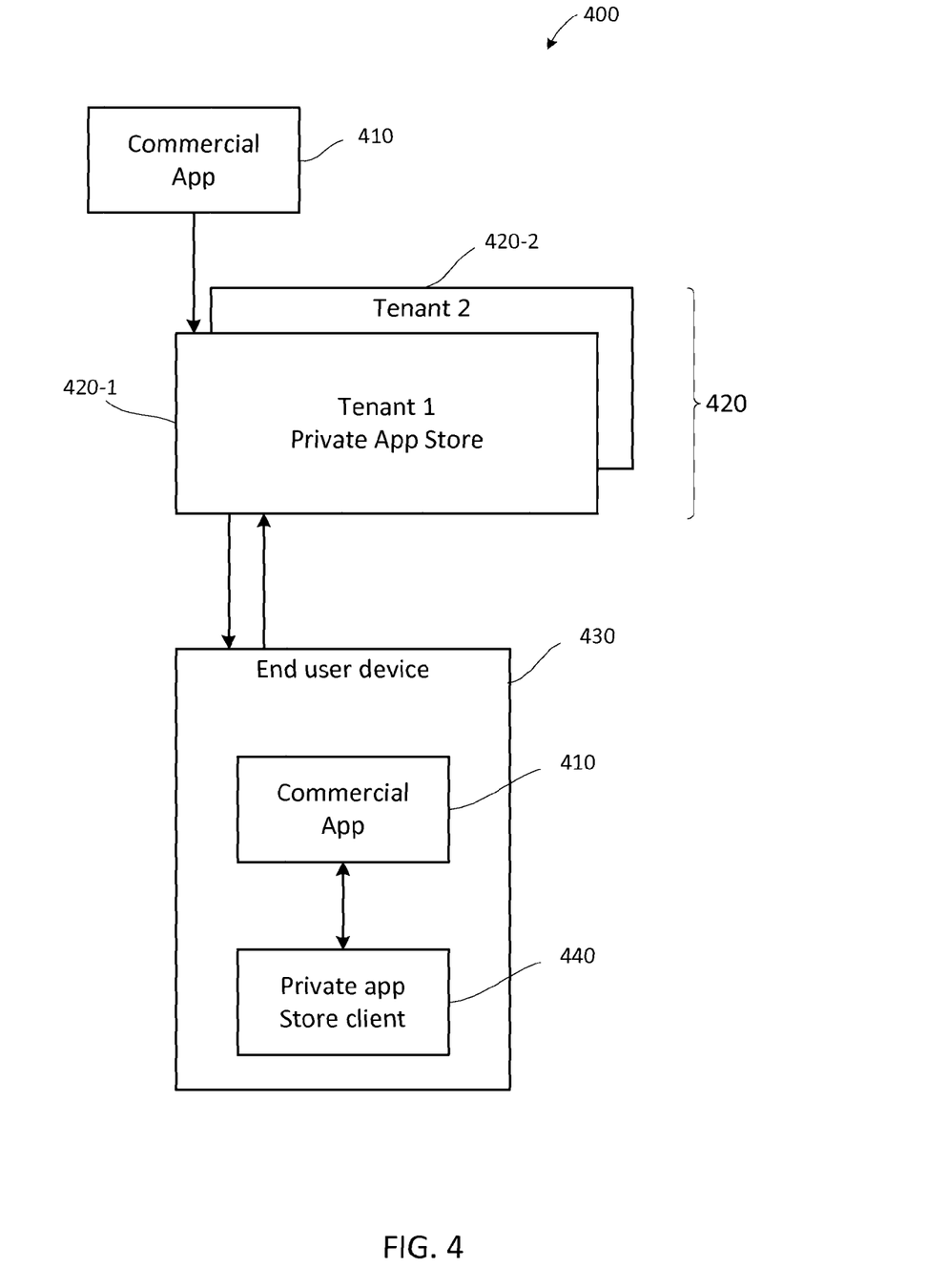
FIG. 4 is a block diagram illustrating a system for automated run-time customization of an application.

FIG. 4 is a block diagram illustrating a system for automated run-time customization of an application. System 400 includes a commercial application 410, multiple private app stores 420 and an end-user device 430.

Commercial application 410 can be provided to a private app store (such as 420-1 of FIG. 4) from a developer operating a development device (e.g., development device 110), from a commercial app store or from another private app store. Commercial application 410 may include compiled application software, and embedded policy and licensing libraries. The policy and licensing libraries comprise software for automating run-time customization of commercial application 410.

Private app stores 420 can optionally be elements of a multi-tenanted app store management system. Each app store tenancy within the system can be a distinct private app store, such as one of private app stores 420-1 or 420-2.

End-user device 430 includes the commercial application 410 and private app store client 440. Commercial application 410 can be downloaded from the private app store 420-1 to the end-user device 430. The private app store client 440 may be computer software installed on end-user device 430 and configured to be executed by a processor of the end-user device 430.

In an example embodiment of customization of an application, an application wrapping can be used to customize the application. Application wrapping is a method of adding a layer to existing mobile application binary code to add features or modify functionality, without requiring changes to the underlying existing application. For example, an application wrapper may be interposed on a pre-written application before allowing a user computing device to download the pre-written application. The application wrapper may be configured to control an operation of the pre-written application. For example, a commercial application can be customized for one or more end-users by adding a layer to the commercial application that facilitates customization, without accessing the source code of the commercial application to modify the commercial application.

In another example embodiment of customization of an application, an un-compiled application may be published in the commercial app store. The application can then be customized and compiled before being published in the private app store as a customized app.

In still another example embodiment of customization of an application, a customer (for example, a commercial enterprise or business) can place an order via a commercial app store for a customized app. A developer can customize an application and publish the customized application for the customer. The developer can publish an application profile in the commercial app store, and publish the customized application to the customer or to a private app store, for example.

A benefit of run-time customization of commercial apps over other embodiments is that run-time customization is scalable. The systems and methods for run-time customization described herein can support multiple apps, multiple end-users and multiple tenants. Since customization is automatic at run-time, version control of the custom application can be implemented through version control of the single commercial app.

A mobile employee requiring access to a PC desktop via a mobile device can download and install the application from the private app store. When the employee launches the application, the application has the appearance of a custom application (that is an application designed or branded specifically for the employee or the employee's company).

FIG. 5 is a block diagram showing an example system architecture. The example system 500 architecture includes a development computing device 510, a user computing device 520, a commercial app store system 530, a private app store system 540, and a network 502. As will be appreciated the system 500 may include one or more of each of these devices.

The development computing device 510 includes at least one processor 512, an operating system 514, an application developer module 516, and at least one memory 518. The at least one processor 510 and the at least one memory 518 are communicatively coupled via a bus (not shown). The at least one processor 510 and the at least one memory 518 may be hardware (e.g., silicon based) physical devices. According to example implementations, the operating system 514 manages hardware resources associated with development computing device 510 and provides common services for computer programs executing on development computing device 510. According to example implementations, the application developer module 516 may be an integrated development environment (IDE) supporting any number of programming languages and configured to develop (e.g., code and compile) applications. The development computing device 510 may be, for example, an element of any computing device (e.g., personal computer, a laptop computer and the like).

The user computing device 520 includes at least one processor 522, an operating system 524, an application module 526, and at least one memory 528. The at least one processor 520 and the at least one memory 528 are communicatively coupled via a bus (not shown). The at least one processor 520 and the at least one memory 528 may be hardware (e.g., silicon based) physical devices. According to example implementations, the operating system 524 manages hardware resources associated with user computing device 520 and provides common services for computer programs executing on user computing device 520. According to example implementations, the application module 526 may include a datastore including at least one application the tools to execute applications (e.g., a runtime) and a mechanism used to acquire/update applications. According to example implementations, the application module 526 includes a private app store client 527. The private app store client 527 may be configured to communicate with the private app store system 540 to fetch data (e.g., a logo) associated with customization of an application. The user computing device 520 may be, for example, an element of any computing device (e.g., personal computer, a laptop computer and the like).

The commercial app store system 530 includes at least one processor 532, an operating system 534, an application server 536, and at least one memory 538. The at least one processor 532 and the at least one memory 538 are communicatively coupled via a bus (not shown). The at least one processor 532 and the at least one memory 538 may be hardware (e.g., silicon based) physical devices. According to example implementations, the operating system 534 manages hardware resources associated with the commercial app store system 530 and provides common services for computer programs executing on the commercial app store system 530. According to example implementations, the application server 536 may be configured to enable a user device to directly or indirectly download commercially available applications. The commercial app store system 530 may be, for example, an element of any computing device (e.g., a networked computer, a cloud computer, and the like).

The private app store system 540 includes at least one processor 542, an operating system 544, an application server 546, an admin console 548, an application datastore 550, a customization datastore 552, a customization module 554 and at least one memory 558. The at least one processor 542 and the at least one memory 558 are communicatively coupled via a bus (not shown). The at least one processor 542 and the at least one memory 558 may be hardware (e.g., silicon based) physical devices. According to example implementations, the operating system 544 manages hardware resources associated with the private app store system 540 and provides common services for computer programs executing on the private app store system 540. The private app store system 540 may be, for example, an element of any computing device (e.g., a networked computer, a cloud computer, and the like). In one example implementation, the private app store system 540 includes a plurality of the elements described herein which (in combination) function as a tenant private app store. For example the private app store system 540 may include a plurality of application servers 546 each representing a tenant. Alternatively, or in addition to, in another example implementation system 500 may include a plurality of private app store systems 540 each representing a tenant.

According to example implementations, the application server 546 may be configured to enable a user device to download the applications associated with the commercial app store system 530. In one example implementation, the application server 546 may coordinate with the commercial app store system 530 to download apps to the user computing device 520. Alternatively, and/or in addition to, the application datastore 550 may be configured to store application packages for download to the user computing device 520. The customization module 554 may be configured to determine what data is necessary to customize an application at run-time as discussed throughout this disclosure. For example, the customization module 554 may receive a query from the private app store client 527 and return customization data (e.g., a logo) to the private app store client 527. The customization module 554 may also be configured to (in association with the private app store client 527) determine an association between the end-user and the tenant. For example, the customization module 554 may determine an end-user identity and tenant with which the end-user is associated An IT administrator can purchase applications and assign them to end-users operating the user computing device 520. The private app store system 540 can use the system and methods described herein to customize (and/or provide data for customization) the purchased applications and then make them available for download to the user computing device 520. In some embodiments, the user computing device 520 can download the applications directly from the private app store system 540. In other embodiments, the user computing device 520 can download the applications from the commercial app store system 530.

In an example implementation, a company with a mobile workforce may wish to provide its mobile employees with an application that enables remote access to their personal computer (PC) desktops from a mobile device. In this example, it is assumed that an Information Technology (IT) administrator wishes to purchase multiple licenses of the remote desktop application for use by the company's employees. Using the system and method described herein, the IT administrator can view available applications on a commercial app store and purchase a quantity of licenses using, for example, a credit card or purchase order. Once the application is purchased and made available to the IT administrator, along with the specified number of licenses, the IT administrator can assign the application to the employees. The IT administrator can have access to a tenancy in a multi-tenanted private app store, for example. The system and method described herein can automatically customize the purchased application at run-time based on the app store tenancy with which the employee is associated.

The systems and methods described herein can automatically customize the purchased application as part of the purchase process (e.g., as discussed above, the customization may occur on application launch). The IT administrator can assign the purchased application to a group of employees and/or to individual employees. The application can be presented to the employee via the native iOS/Android device client and can allow the employee to install the application onto their mobile device. Once the application is assigned to the employees, via a group assignment or directly, the system can track and display the number of licenses that have been assigned to the employees. As each employee installs the application onto their mobile device and/or another device, the system can track and display the number of consumed licenses. If the employee leaves the company or decommissions their device, the system can disable the application so that it can no longer be used. The system can then recoup the license, and add it back to the number of available licenses for the application.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium (e.g., a non-transitory computer readable medium). A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method of delivering a customized application to an end-user computing device, the method comprising:
receiving, at a commercial app store system, an application including embedded customization code as a layer of code configured to allow run-time customization of the application without accessing the source code of the application;
publishing, by the commercial app store system, the application to a commercial app store, the commercial app store being configured to publish and download the application without end-user customization;
receiving, at the commercial app store system, a request to acquire at least one license for the application from a private app store, the private app store being a tenant of a multi-tenanted application management system;
publishing, by the private app store:
the application as a customized application including customization data selected based on the at least one license and stored separately from the customized application, the customization data being retrieved by the customized application, using the layer of code, at run-time when the customized application is executed by the end-user computing device, and a profile for the customized application in the private app store;

installing the customized application on the end-user computing device from the private app store using the license acquired by the private app store;

receiving, at the commercial app store system from the end-user computing device, an indication that the application has launched and includes end-user and tenant information;

fetching, by the commercial app store system from the private app store, the customization data based on the end-user and tenant information; and communicating the customization data from the private app store to the end-user computing device.

2. The method of claim 1, wherein
the end-user computing device is associated with the tenant.

3. The method of claim 2, wherein the end-user computing device includes client software configured to provide access to the private app store and to determine an association between the end-user and the tenant.

4. The method of claim 1, wherein code used for run-time customization includes libraries that includes at least one of a policy library and a license management library.

5. The method of claim 1, further comprising:
determining an end-user identity and tenant with which the end-user is associated.

6. The method of claim 1, wherein the customization data includes data related to at least one of a tenant and the end-user.

7. The method of claim 6, wherein the customization data includes at least one of a logo and a company name.

8. The method of claim 1, further comprising adding a layer to binary code associated with the application, the layer being configured to at least one of add features and modify functionality, without requiring changes to the application.

9. The method of claim 1, wherein publishing the customized application to the private app store makes the customized application available for downloading to the end-user computing device.

10. An enterprise computing system comprising:
a private app store associated with at least one end-user computing device, the private app store being a tenant of a multi-tenanted application management system configured to:
receive an application including embedded customization code as a layer of code configured to allow run-time customization of the application without accessing source code of the application from a commercial app store configured to publish and download the application without end-user customization;
associate a license with the application and the at least one end-user computing device;
publish:
the application as a customized application including customization data selected based on the at least one license and stored separately from the customized application, the customization data being retrieved by the customized application, using the layer of code, at run-time when the customized application is executed by the end-user computing device, and
a profile for the customized application in the private app store;

receive, at the commercial app store system an indication of a launch of the customized application installed on the end-user computing device, and end-user and tenant information;

fetch, by the commercial app store system from the private app store, the customization data based on the end-user and tenant information; and communicate the customization data from the private app store to the end user device.

11. The enterprise computing system of claim 10, wherein the end-user computing device is associated with the tenant.

12. The enterprise computing system of claim 11, wherein the end-user computing device includes:
a client configured to access the private app store and to determine an association between the end-user and the tenant; and
the customized application includes embedded customization code configured to communicate with the client and to request the customization data upon the launch of the application.

13. A non-transitory computer readable medium storing code segments, that when executed by a processor, cause the processor to perform steps comprising:
receiving, at a commercial app store system, an application including embedded customization code as a layer of code configured to allow run-time customization of the application without accessing source code of the application and configured to execute upon launch of the application on an end-user computing device;
publishing, by the commercial app store system, the application to a commercial app store, the commercial app store being configured to publish and download the application without end-user customization;
receiving, at the commercial app store system, a request to acquire at least one license for the application from a private app store, the private app store being a tenant of a multi-tenant application management system;
associating the application with a license to the private app store, the private app store being associated with the end-user computing device;
publishing, by the private app store,
the application as a customized application including customization data selected based on the at least one license and stored separately from the customized application, the customization data being retrieved by the customized application, using the layer of code, at run-time when the customized application is executed by the end-user computing device, and
a profile for the customized application in the private app store, wherein the customized application includes libraries that is used for run-time customization of the application;
installing the customized application on the end-user computing device from the private app store using the license acquired by the private app store;
receiving, at the commercial app store system an indication from the end-user computing device that the application has launched, and end-user and tenant information;
fetching, by the commercial app store system from the private app store, the customization data based on the end-user and tenant information; and
communicating the customization data from the private app store to the end-user computing device.

14. The non-transitory computer readable medium of claim 13, wherein the end-user computing device is associated with the tenant.

15. The non-transitory computer readable medium of claim 14, wherein the end-user computing device includes a client configured to access the private app store and to determine an association between an end-user and the tenant.

16. The non-transitory computer readable medium of claim 13, wherein the embedded customization code includes at least one of policy and license management libraries.

17. The non-transitory computer readable medium of claim 13, the steps further comprising:
   determining an end-user identity and tenant with which an end-user is associated.

18. The non-transitory computer readable medium of claim 13, wherein the customization data includes data related to at least one of a tenant and an end-user.

* * * * *